(12) United States Patent
Bachhuber et al.

(10) Patent No.: US 11,636,617 B2
(45) Date of Patent: Apr. 25, 2023

(54) ASCERTAINMENT OF PREDISTORTION DATA FOR A PROJECTION AND PROJECTOR MODULE

(71) Applicant: DIEHL AEROSPACE GMBH, Ueberlingen (DE)

(72) Inventors: Martin Bachhuber, Altdorf (DE); Frank Schmid, Poppenricht (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 9 days.

(21) Appl. No.: 16/430,972

(22) Filed: Jun. 4, 2019

(65) Prior Publication Data
US 2019/0385330 A1    Dec. 19, 2019

(30) Foreign Application Priority Data

Jun. 15, 2018    (DE) .......................... 102018004829.3

(51) Int. Cl.
*G06T 7/70* (2017.01)
*H04N 9/31* (2006.01)

(52) U.S. Cl.
CPC .............. *G06T 7/70* (2017.01); *H04N 9/3185* (2013.01); *G06T 2207/30204* (2013.01); *G06T 2207/30244* (2013.01); *G06T 2207/30268* (2013.01)

(58) Field of Classification Search
USPC ....................................................... 348/125
See application file for complete search history.

(56) References Cited

U.S. PATENT DOCUMENTS

| 2011/0095911 | A1  | 4/2011 | Babst et al. |
| 2014/0192268 | A1* | 7/2014 | Petrisor ............... G06F 3/017 |
| | | | 348/734 |

FOREIGN PATENT DOCUMENTS

DE    102007023344 A1    12/2008

OTHER PUBLICATIONS

Gao, X. et al., "Complete Solution Classification for the Perspective-Three-Point Problem", IEEE, 2003. p. 4f.
(Continued)

*Primary Examiner* — Mikhail Itskovich
(74) *Attorney, Agent, or Firm* — Scully Scott Murphy and Presser

(57) ABSTRACT

In a method for ascertaining predistortion data (2) for a projection from a projector (4) onto a target surface (13) with known geometry data, a camera (10) is placed in a known relative pose (RKP) with respect to the projector and aligned toward the target surface (13), the relative pose of the camera with respect to the target surface (RKZ) is ascertained from a camera image by means of machine vision, and the relative pose (RPZ) of the projector (4) with respect to the target surface (13) is ascertained herefrom and from the relative pose (RKP), and the predistortion data (2) are ascertained on the basis of the geometry data and of the relative pose (RPZ) of the projector (4) with respect to the target surface (13).
A projector module (22) contains a calculation unit (3) for performing the method, and the projector (4) and the camera (10).
The camera (10) of the projector module (22) or in the method is used for optically monitoring the interior (5).
An interior camera is used as the camera (10) of the projector module (22) or in the method.

11 Claims, 3 Drawing Sheets

(56) References Cited

OTHER PUBLICATIONS

"Open Source Computer Vision Library", retrieved from the internet at https://www.opencv.org.
"LearnOpenCV: Approximate Focal Length for Webcams and Cell Phone Cameras", retrieved from the internet at https://www.learnopencv.com/approximate-focal-length-for-webcams-and-cell-phone-cameras/ (Dec. 21, 2017).
"ArUco Marker", retrieved from the internet at https://www.uco.es/investiga/ grupos/ ava/ node/ 26.
Garrido-Jurado, S. et al., "Automatic generation and detection of highly reliable fiducial markers under occlusion", University of Cordoba, Cordoba, 2014.

* cited by examiner

ASCERTAINMENT OF PREDISTORTION DATA FOR A PROJECTION AND PROJECTOR MODULE

BACKGROUND OF THE INVENTION

The invention relates to a method for ascertaining predistortion data for a projection of an image content from a projector in an interior of a vehicle onto a target surface of the interior and to a projector module for a projection of an image content in an interior of a vehicle onto a target surface of the interior.

DISCUSSION OF THE PRIOR ART

From practice it is known to use a projection system to project contents, such as images or light patterns, onto for example inclined and/or curved surfaces in an interior of a vehicle, specifically the passenger cabin of an aircraft. The surfaces are, for example, closed luggage compartments. In order to correct distortions in the reproduction of the content (image distortions) which occur due to the shape of the surface, correction information (predistortion in the projector based on predistortion data) is required. Ascertaining these predistortion data is complex in practice.

SUMMARY OF THE INVENTION

The present invention is directed to improving the ascertainment of predistortion data in the case of a corresponding projection. More specifically, the present invention is directed to a method for ascertaining predistortion data for a projection of an image content onto a target surface The projection is effected starting from a projector. The projector is situated in an interior of a vehicle. The target surface is a target surface of the interior. Geometry data of the target surface are known. The projector is situated in an appropriate assembled state in the interior. In the method, a camera is placed in a known relative pose with respect to the projector. The camera is here aligned such that at least part of the target surface lies within the field of view of the camera. That means that when the camera records a camera image, at least part of the target surface is imaged in the camera image. A camera image is then recorded using the camera. The relative pose of the camera with respect to the target surface is ascertained from the camera image. The relative pose relates to the time point of the recording of the camera image. The ascertainment is effected by means of machine vision, that is to say methods, procedures and basic principles of machine vision are applied to ascertain the relative pose as part of an evaluation of the camera image. The relative pose of the projector with respect to the target surface is ascertained from the ascertained relative pose of the camera to the target surface and from the known relative pose of the camera to the projector. The predistortion data are then ascertained based on the known geometry data of the target surface and on the ascertained relative pose of the projector with respect to the target surface.

"Image content" is understood to mean any light information that is reproducible by the corresponding projector, such as videos, images, texts, patterns or simply only single-colour light. The target surface is a surface of the interior onto which the projection of the image content is desired. The term "pose" in the present case is to be understood to mean in all cases the combination of a position (spatial information) and orientation (directional information). Relative pose in particular is to be understood to mean the coordinate information in a coordinate system, in particular in a coordinate system in which CAD data for the target surface and other objects mentioned further below are also present. At least the coordinate transformations between different coordinate systems in which the respective information is present are known.

The camera is placed here such that it can be assumed that the view from the camera to the surface is generally free unless an obstacle, such as a person, is for example temporarily located in the field of view. The "geometry data" describe the shape or form of the target surface, for example whether and how the latter is curved, what dimensions it has and so on. In particular, the target surface is at least partially curved and/or has edges and/or planar surface pieces. In particular, the target surface is at least partially inclined in relation to an optical axis of the projector that is directed to the target surface.

The corresponding predistortion of the image content can also be referred to using the term "image warping". "Machine vision" is to be understood to mean in particular automatic and/or computer-based methods and algorithms for image evaluation which provide geometric dimensions, data, relationships.

According to the invention, the result is an automatic camera-based projector configuration. Consequently, the invention proposes a method which ascertains the correction information for correcting distortions of the projected image on a particularly curved surface on the basis of an estimate or ascertainment of the relative position of the projector with respect to the projection surface (target surface) using machine vision (in particular photogrammetric methods).

The present invention is based on the idea that projection onto curved surfaces is to be accomplished using a projector or projection system for the or in the vehicle interior (aircraft cabin). In order to correct the distortions caused by the curvature, the invention proposes a method that calculates said correction information from the geometry data (in particular CAD model of the cabin) and from the relative position of the projector with respect to the projection target (target surface). Since it is not possible to rule out that said relative position in the interior (cabin) changes during the system's lifetime, a method is proposed which can ascertain or estimate said relative position in the interior (aircraft cabin) using machine vision (in particular photogrammetric methods) in order to update the correction information (predistortion data) with said information The present invention uses machine vision (computer vision). In addition to the system projector-target surface, a camera which can capture the region of the projected image (and in particular the immediate environment thereof) is installed to this end. The relative position of the camera with respect to the target surface (in particular distinctive points on the projection surface, also known as features) can be estimated or ascertained using the presented image of the target surface (in particular said distinctive points). If the camera is then mounted in a known, in particular unchanging relative pose (distance, orientation) with respect to the projector (for example in the same housing), the relative position of the projector with respect to the target surface is thus also known, and correction information (predistortion data or the correction thereof) can be determined based on the geometry data (in particular CAD model) and the ascertained relative position.

One advantage of the present invention is that the correction of the distortion due to curved surfaces, that is to say the predistortion data, can be contactlessly determined automatically during the lifetime of the system using the method described. The camera system could furnish in particular additional information (in the form of the image data recorded by the camera) relating to the interior (the cabin), such as recognition of an open bin (luggage compartment).

Corresponding methods of machine vision are well known. Merely by way of example, reference in this respect is made to: "X. Gao, X. Hou, J. Tang, H. Cheng. Complete Solution Classification for the Perspective-Three-Point Problem. IEEE, 2003. p. 4f.", "Open Source Computer Vision Library. www.opencv.org", "LearnOpenCV: Approximate Focal Length for Webcams and Cell Phone Cameras. www.learnopencv.com/approximate-focal-length-for-webcams-and-cell-phone-cameras/(21.12.2017)", "ArUco Marker. www.uco.es/investiga/grupos/ava/node/26" or "S. Garrido-Jurado, R. Munoz-Salinas, F. J. Marin-Jimenez. Automatic generation and detection of highly reliable fiducial markers under occlusion. University of Cordoba, Cordoba, 2014". The method described is therefore easily implementable using known methods.

In a preferred embodiment, machine vision is at least partially effected in the form of photogrammetric methods. Corresponding methods are well known. These, too, are well-known, which means that the method can here be performed on a needs-oriented basis.

In a preferred embodiment of the invention, CAD data of the target surface are used as the geometry data of the target surface. Such CAD data for vehicles, in particular aircraft, are available in a generally sufficient form and with the necessary accuracy, such that the required geometry data are available particularly easily.

In a preferred embodiment, the camera is aligned such that at least part of the environment of the target surface is situated in the field of view of the camera, wherein geometry data of the environment captured by the camera in relation to the target surface are also known. Consequently, additional information for evaluation in machine vision is available. The results provided are thus generally improved. It is possible by way of a suitable selection of the environment to ensure even for uniformly smooth target surfaces without corners and edges, which might under certain circumstances be evaluable with difficulty using machine vision, that correspondingly evaluable structures (edges, corners etc.) are contained in the camera image. Highly accurate ascertainment of the relative pose of the camera with respect to the projector can thus be accomplished even in this case.

In particular in the case of CAD data, geometry data for the corresponding environment are also generally available as CAD data, wherein the relative pose relationships between environment and target surface are known in this case.

In a preferred embodiment, as at least part of the machine vision process, at least one distinctive element in the camera image is detected. The relative pose of the distinctive element with respect to the target surface is known here. In particular, two, three or four or more elements are detected. "Detected" here means that they are recognized in the camera image and the relative pose thereof with respect to the camera is determined. In turn, the relative pose between the camera and target surface is ascertainable based on the known relative pose between the element and target surface.

In a preferred variant of this embodiment, a characteristic structure of the target surface and/or—if present—of the environment of the target surface is detected as at least one of said elements. Such "characteristic structures" are those that are already present on the target surface and/or in the environment, such as points, lines, edges, corners. Examples are peripheries, edges, trims, handles of a storage compartment, exit openings for air, lamps etc. As a result, special markers or the like do not need to be attached as elements for the purpose of the method. The markers belong to the original interior or to the target surface per se.

In a preferred variant of the method, a marker attached to the target surface and/or—if present—to the environment of the target surface is detected as at least one of said elements. The corresponding markers are attached especially in particular for the purpose of the method and consequently are not part of the original interior or the target surface per se. Such markers can be visible or invisible (infrared, ultraviolet) to the human eye, but are certainly detectable using the camera (that is to say in the camera image). The markers can be active (self-luminous) or passive. Examples are for example stickers, coloured varnishes, active luminous markers (LEDs), etc. Such markers can then be adapted particularly well to the camera or the recognizability in the camera image and result in a particularly reliable evaluation as part of the machine vision process.

In summary, it can be stated that: suitable markers or distinctive points are in particular the edges of the target panel (interior panel as target surface), attached visible (to the human eye) marks (for example ArUco markers), attached invisible (to the human eye) marks (for example UV-paint irradiated with UV LEDs from the projector or camera) or infrared sources recessed in the panel. It is possible in particular to calculate the relative position in general on the basis of at least three distinctive locations (elements). By using more than three markers, in particular the accuracy can be increased. If less than three points are used, it is possible in particular by way of additional plausibility considerations to make a statement relating to the relative position (relative pose of the camera with respect to the markers and thus to the target surface).

In a preferred embodiment of the method, it is assumed that predistortion data, as have already been described, are present and exist even before the ascertainment of such predistortion data begins. The predistortion data present here relate to a first relative pose of the projector with respect to the target surface. The performance of the method, as has been described above, now begins. Here, a second relative pose of the projector with respect to the target surface is ascertained. A deviation between the second and the first relative pose is then ascertained. If the deviation is greater than a specified threshold value, the predistortion data are corrected and/or ascertained again on the basis of the second relative pose. The method described above is therefore possibly terminated (for a deviation of less than the threshold value) by virtue of the ascertainment of the predistortion data consisting of the already previously known predistortion data being maintained. Otherwise, the method is terminated by virtue of the predistortion data being ascertained again or (in particular slightly) corrected. An "ascertainment" in the narrower sense of a complete mathematical recalculation of the predistortion data etc. consequently does in particular not take place in this case. In other words, the "ascertainment method" then becomes a "comparison method" or "correction method". The deviation that has been established can be in particular zero.

In a preferred embodiment, the target surface used is one which is curved in at least one portion. For curved target surfaces, an adequate predistortion of the image content that is to be reproduced is particularly important, which can be performed particularly easily with the method of the present invention.

In a preferred embodiment, the target surface selected is a surface of a storage compartment. In particular, this storage compartment is located in the interior, in particular in the passenger cabin of an aircraft as the vehicle. Such storage compartments frequently exhibit complex curved surfaces, but are desirable as a location for a corresponding projection. The method described can be used to particularly easily realize a distortion-free projection.

In a preferred embodiment, the method is carried out in an aircraft as the vehicle having a passenger cabin as the interior. The advantages of the method described above can in this way be exploited especially for this intended use.

The present invention is also directed to a projector module for a projection of an image content in an interior of a vehicle onto a target surface of the interior. The projector module contains a calculation unit, which is set up to perform the method according to the invention, and the projector, which was explained in connection to the method, and the corresponding camera.

The projector module and at least some of the embodiments thereof and the respective advantages already have been explained analogously in connection with the method according to the present invention.

In a preferred embodiment, the projector module contains a support structure, to which the projector and the camera are attached in a fixed relative pose with respect to one another. In particular, the projector and camera are accommodated in the same housing. In particular, the support structure is at least a part of the housing, or at least some part of the housing is embodied as the support structure. The known relative pose between the camera and projector, as required in the method, can be realized particularly easily in this way.

The present invention is also directed to the use of the camera of the projector module according to the invention or of the camera, used in the method according to the invention, for optically monitoring the interior. "Monitoring" can here be effected "manually", that is to say by virtue of a person observing the camera image or automatically by virtue of machine evaluation of the camera image. The camera consequently performs a dual purpose, specifically first that which is assigned to it by the above-described method or projector module; and second, that of a conventional monitoring camera. This is in particular suitable when used in an aircraft, because in this way, a further component (second camera) can be dispensed with and consequently weight can be reduced.

The present invention is further directed to the use of an interior camera in an interior of a vehicle as the camera of the projector module according to the invention or in the method according to the invention. The interior camera is in particular a monitoring camera, which is already mounted in the interior. Due to the dual use thereof, no separate camera needs to be provided for the method or the projector module. This once again offers the above-mentioned advantages (weight reduction) in particular in an aircraft.

The invention is based on the following findings, observations or considerations and also includes the following embodiments. The embodiments are here also referred to as "the invention", partly for the purposes of simplification. The embodiments can here also contain parts or combinations of the above-stated embodiments or correspond to them and/or possibly also include embodiments which have not yet been mentioned.

The fundamental idea of the present invention is a concept for camera-controlled calibration and control of a projection system. The invention proceeds from the idea of proposing, using photogrammetry, a method for automatic calibration and readjustment of the image distortion (or the predistortion) of the projector system in an aircraft cabin by way of the camera mounted in the projector (module). The purpose of the calibration is the predistortion of the image produced by the projector in the manner such that the image that falls onto the target surface is shown without distortion, independently of the geometry of the target surface and the alignment of the projector relative to the target surface ("independent" means: depending on the current, different or variable conditions). A fundamental idea of the invention is furthermore a calibration method which ascertains the calibration information on the basis of the CAD model of the aircraft cabin and projector integration. As an extension thereof, a concept with which essential parameters for the CAD-based calibration in the cabin are determined by means of photogrammetry is proposed. The system can consequently even in the installed state react automatically to changes, for example the variable distance between the projector and target surface due to air pressure changes.

The present invention gives rise in particular to the use of computer vision (machine vision) for contactlessly automatically estimating the relative position of the projector with respect to the projection surface (target surface) and the selection of suitable markers which are able to be used in the aircraft cabin.

The fundamental method for predistortion (warping) of the projector image is, for example, as follows: first, the image to be distorted is combined with a grid such that pixel positions are assigned to regular grid points. The grid is then transformed to the target form by way of a correction vector field, which is defined by vectors at the locations of the grid points. The previously defined pixel-grid point pairs are displaced exactly in accordance with this rule and pixel locations between the grid points are determined by way of interpolation.

The calibration algorithm determines the optimal correction vector field in dependence on the geometry of the target surface, the relative position of the projector and target surface, and the properties of the projector (emission behaviour).

BRIEF DESCRIPTION OF THE DRAWINGS

Further features, effects and advantages of the invention can be gathered from the description of a preferred exemplary embodiment of the invention that follows and from the accompanying figures, in which, in a schematic basic outline.

DETAILED DESCRIPTION OF THE INVENTION

Figure 1:
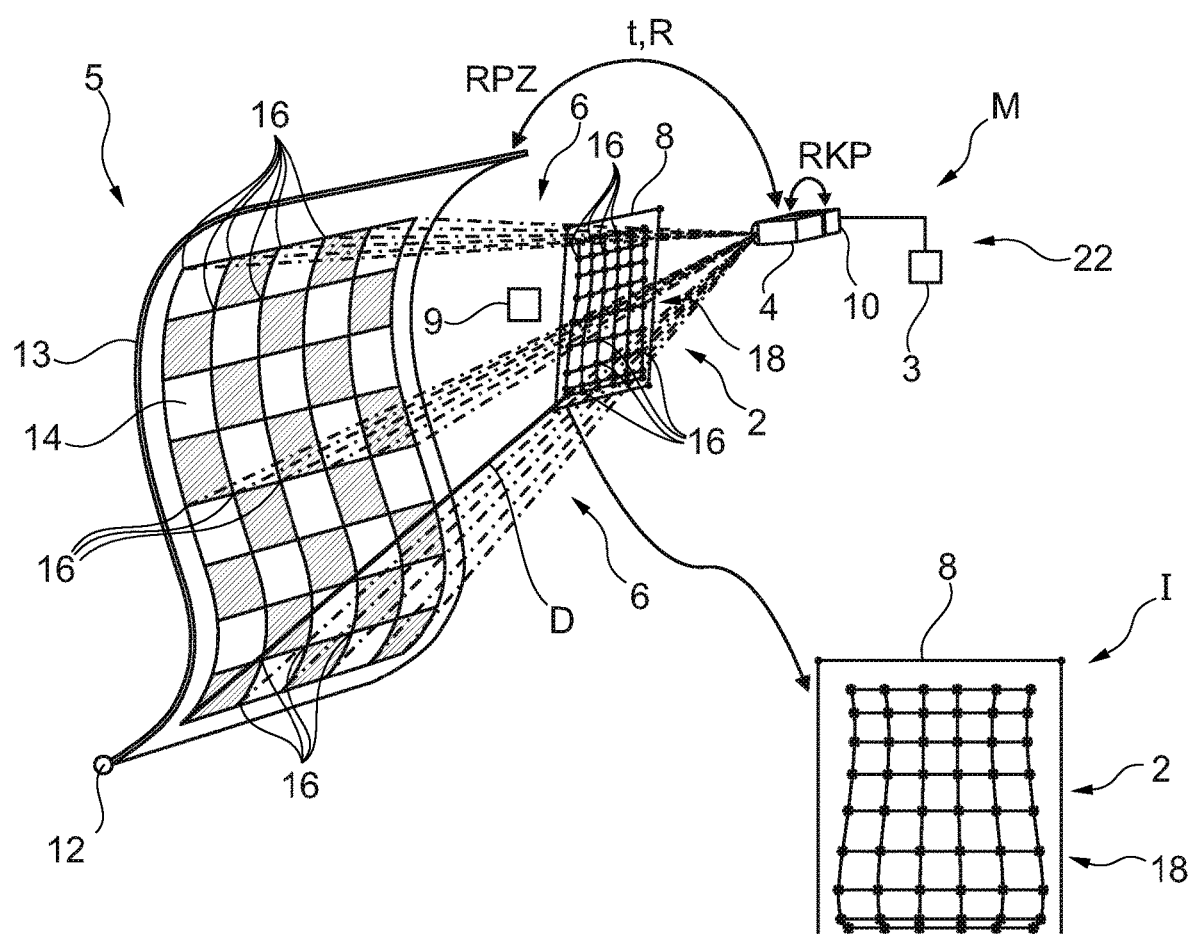
FIG. 1 shows a projection onto a target surface.

FIG. 1 schematically illustrates a CAD-based calculation of predistortion data 2 (symbolically illustrated perspectively as a correction vector field and then again in detail I). Calculation is performed here in a calculation unit 3 (indicated merely symbolically). A projector 4 in an interior 5 (not illustrated in more detail) of a vehicle, in the present case a passenger cabin of an aircraft, is modelled here by way of its ray path 6 and by its (imaginary, virtual) reference surface 8. The projector is situated in an assembled state M in the aircraft, which is to say it is mounted at its intended installation location. The reference surface 8 is here the surface on which the projector 4 can present a distortion-free, homogeneous and focused image of an image content 9, which is illustrated here symbolically. The image content 9 is actually projected onto a target surface 13. For camera control, a camera 10 is mounted parallel to the projector 4 with a known relative position RKP (indicated by a double-headed arrow) with respect to the projector 4, which camera can record the target surface 13 and image it in a camera image. The positions of all participating objects are referenced with respect to a freely selectable geometric reference point 12 (zero point).

In a first step, a regular grid 14 (here indicated by a chequerboard pattern) is defined on the target surface 13, in the present case a luggage compartment, of the interior 5, with said grid determining the form of the image to be presented. Using a ray tracing method, the ray path 6 for each individual grid point 16 of the chequerboard pattern is then ascertained so as to draw a conclusion as to the image 18 which must be presented on the reference surface 8 for an undistorted image to be shown on the target surface 13. In addition, a brightness difference, which may have to be adapted, between the individual grid points 16 can also be deduced on the basis of the known distance D (indicated by way of example by a thickened line) between the grid points 16 on the reference surface 8 and target surface 13.

For the use in the aircraft cabin, the radiation behaviour and the reference surface 8 of the projector 4, and also the geometry of the target surface 13, should be considered to be constant. Both parameters can be ascertained on the basis of the CAD data of the cabin or from measurements.

The relative position RPZ of the projector 4 with respect to the target surface 13 should be considered to be variable. The relative position RZP consists of a translation t and a rotation R which the projector 4 assumes with respect to the target surface 13.

The relative position RPZ can substantially deviate from the planned integration for the following reasons: tolerances of the installation of the system and change of the panel position that is dependent on the cabin pressure. These two aspects should therefore be managed in the cabin by way of a camera system. It is assumed that a camera 10 with a known relative position RKP with respect to the projector 4 is mounted. Using a method of photogrammetry, the relative position RKZ of the camera 10 is to be determined in dependence on markers 20 (in this case distinctive points) on the target surface 13 and consequently also the position RPZ of the projector relative thereto (see FIG. 2).

Figure 2:
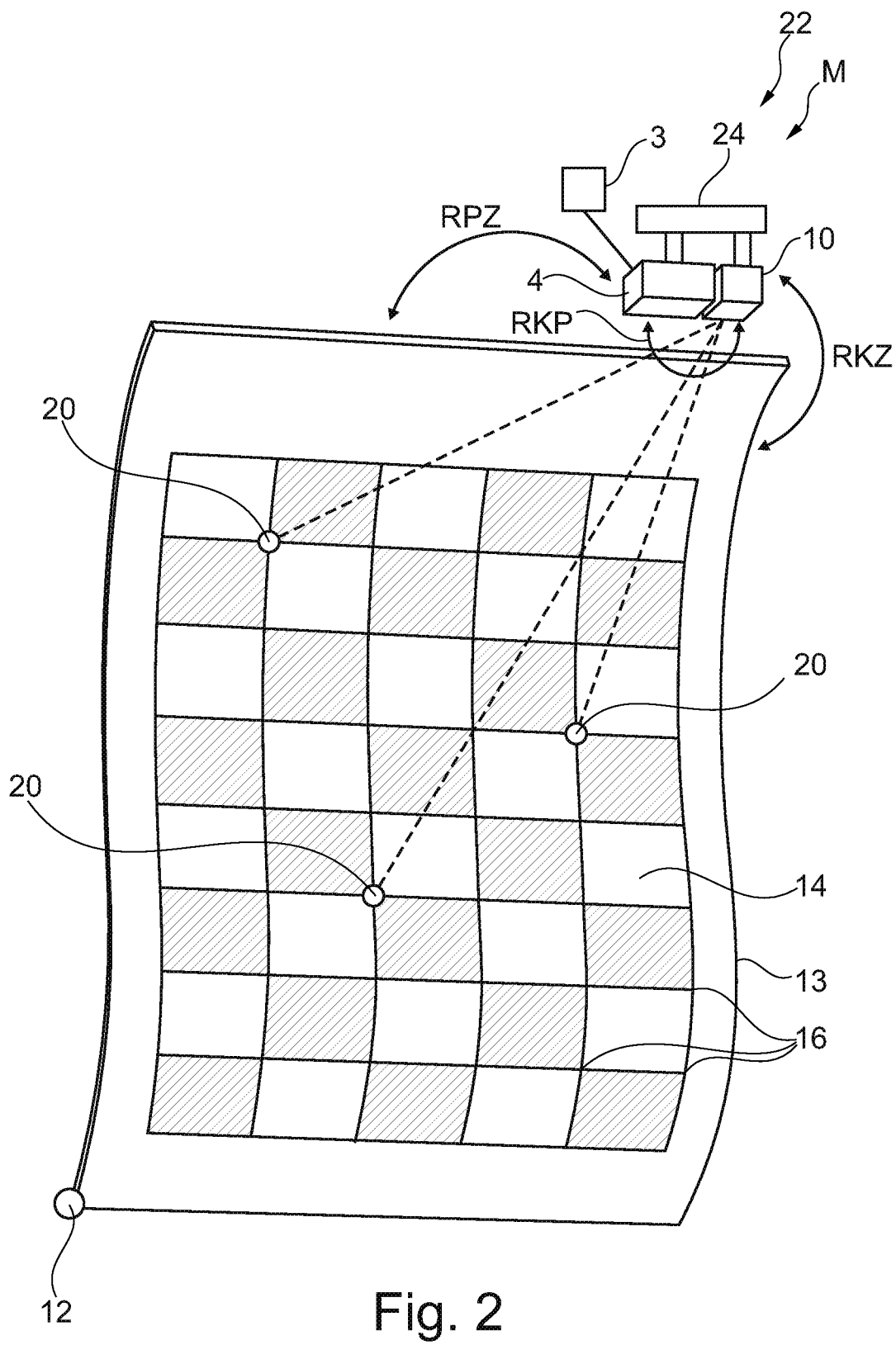
FIG. 2 shows capturing of the target surface by way of a camera.

FIG. 2 illustrates the following: in order to determine the relative position RKZ, the camera 10 captures at least three distinctive elements 20, here markers or points on the target surface 13 having 3D coordinates which are known relative to the geometric origin (reference point 12). The elements 20 which are to be captured are here visible corners, protrusions or marks.

By comparing the two-dimensional coordinates of the markers 20 or points on the camera image and the known 3D coordinates thereof, it is then possible to deduce the orientation and position of the camera 10 relative to the geometric reference point 12. The accuracy of the location determination can be increased by using more than three markers 20 or points.

The projector 4, the camera 10 and the calculation unit 3 together form a projector module 22. The projector 4 and camera 10 are here attached to a support structure 24 of the projector module 22. Hereby, their relative pose RKP with respect to one another is fixedly specified or specifiable.

Figure 3:
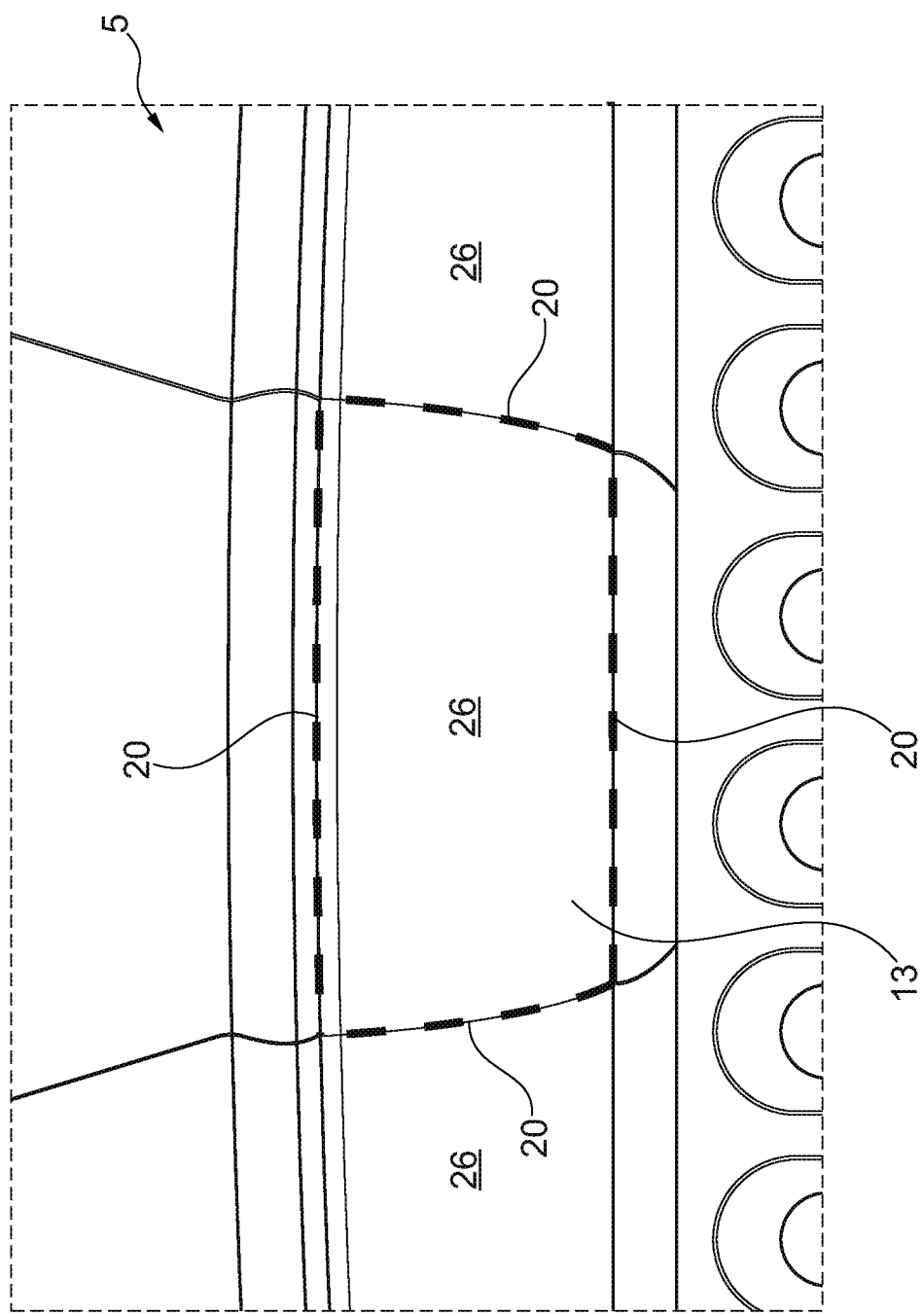
FIG. 3 shows a luggage compartment as an alternative target surface with capturing of the object edges.

FIG. 3 shows, by way of example, a portion of an alternative interior 5 of a passenger cabin of an aircraft. It shows three luggage compartments (two in sections), the central one of which forms a current target surface 13. What is shown is the camera image captured by the camera 10. A contour 26 that has been ascertained with the aid of the camera 10 and the calculation unit 3 is shown in dashed lines. The contour 26 here takes the form of peripheries or edges of the luggage compartment, which here represent the distinctive elements 20 of the target surface 13.

The relative pose RKZ is again ascertained from the contour 26. Otherwise, the method is continued analogously as described above for ascertaining the predistortion data 2.

FIG. 3 also shows how the camera 10 can fulfil a dual use. This is because the camera image can also be used to check whether luggage compartments are still open. In this case, either the camera 10 of the projector module 22 can also be used for monitoring luggage compartments, or, "conversely", a camera 10 which is already present to monitor luggage compartments can also be used as the camera 10 in the projector module 22.

LIST OF REFERENCE SIGNS

2 Predistortion data
3 Calculation unit
4 Projector
5 Interior
6 Ray path
8 Reference surface
9 Image content
10 Camera
12 Reference point/zero point
13 Target surface
14 Grid
16 Grid point
18 Image
20 Distinctive element
22 Projector module
24 Support structure
26 Luggage compartment
RKP Relative position camera-projector
RPZ Relative position projector-target surface
RKZ Relative position camera-target surface
D Distance
t Translation
R Rotation
M Assembled state
I Detail

What is claimed is:

1. A method for ascertaining predistortion data for a projection of an image content from a projector in an interior of a vehicle onto a target surface of the interior, wherein geometry data of the target surface are known, and the projector is situated in an appropriate assembled state (M) in the interior, comprising:
    placing a camera in a known relative pose (RKP) with respect to the projector, wherein the camera is aligned such that at least part of the target surface lies within the field of view of the camera,
    recording a camera image using the camera,
    ascertaining the relative pose of the camera with respect to the target surface (RKZ) from the camera image by means of machine vision,
    ascertaining the relative pose (RPZ) of the projector with respect to the target surface from the relative pose (RKZ) of the camera to the target surface and from the relative pose (RKP) of the camera to the projector, ascertaining the actual predistortion data based on the geometry data of the target surface and on the relative pose (RPZ) of the projector with respect to the target surface, and wherein the camera is aligned such that at least part of the environment of the target surface is situated in the field of view of the camera and the geometry data of the environment captured by the camera in relation to the target surface is known, and wherein characteristic structures of the environment of the target surface, which structures are depicted in the camera image, are detected by means of machine vision such that information of said structures in the environment of the target surface, is additional to, and distinct from, the information received from the target surface, wherein said information is obtained and evaluated using machine vision, and wherein said characteristic structures are located outside of an object that has the target surface, wherein said characteristic structures of the environment of the target surface are selected from at least one of peripheries, lines, edges, trims, handles of a storage compartment, air exists, lamps and combinations thereof, wherein each of said characteristic structures of the environment of the target surface is additional to, and distinct from, the elements of the target surface and each characteristic structure is located outside of an object that has the target surface, wherein machine vision is used to determine the relative pose of the camera to the characteristic structures, wherein the relative pose of the target surface to the target surface environment is known from CAD data, as the target surface is fixed within the target surface environment, wherein the characteristic structures are identified within the camera image and only said structures are evaluated by machine vision, as the relative pose of the characteristic structures to the target surface is known from CAD data, and wherein the relative pose of the camera to the target surface is thereafter calculated using the determined relative pose of the camera to the characteristic structures in addition to the relative pose of the characteristic structures to the target surface which is known, thereby ascertaining the relative pose of the camera to the target surface by such calculation.

2. The method according to claim 1, wherein said machine vision is at least partially effected in the form of photogrammetric methods.

3. The method according to claim 1, wherein CAD data of the target surface are used as the geometry data of the target surface.

4. The method according to claim 1, wherein as at least part of the machine vision process, at least one distinctive element in the camera image is detected, the relative pose of which with respect to the target surface is known.

5. The method according to claim 4, wherein a marker that is attached to at least one of the target surface and the environment of the target surface, is detected as at least one of the elements.

6. The method according to claim 1, wherein predistortion data for a first relative pose (RPZ) of the projector with respect to the target surface already exist, wherein a second relative pose (RPZ) of the projector with respect to the target surface is ascertained, a deviation between the second and the first relative pose (RPZ) is ascertained, and wherein a deviation is greater than a specifiable threshold value, the predistortion data are corrected or ascertained again on the basis of the second relative pose (RPZ).

7. The method according to claim 1, wherein the target surface used is one which is curved in at least one portion.

8. The method according to claim 1, wherein the target surface selected is a surface of a storage compartment.

9. The method according to claim 1, wherein the method is carried out in an aircraft as the vehicle having a passenger cabin as the interior.

10. A projector module for a projection of an image content in an interior of a vehicle onto a target surface of the interior, having a calculation unit, which is set up to perform the method according to claim 1, and having the projector and the camera.

11. The projector module of claim 10, wherein the projector module contains a support structure to which the projector and the camera are attached in a fixed relative pose (RKP) with respect to one another.

* * * * *